Patented Oct. 26, 1948

2,452,121

UNITED STATES PATENT OFFICE 2,452,121

CONVERSION OF SYNTHETIC HYDROCARBONS CONTAINING OXYGENATED COMPOUNDS TO HYDROCARBONS OF HIGH OCTANE VALUE

James H. Grahame, Mount Vernon, N. Y., assignor to The Texas Company, New York, N. Y., a corporation of Delaware No Drawing. Application November 26, 1947, Serial No. 788,325

7 Claims. (Cl. 260—450)

1

This invention relates to a process for the production of high quality motor fuels from the hydrocarbon synthesis reaction between carbon monoxide and hydrogen. In one of its more specific aspects this invention relates to a process for the treatment of the raw hydrocarbon product produced by the synthesis reaction of carbon monoxide with hydrogen to obtain an improved motor fuel.

The synthesis of hydrocarbons by reaction of carbon monoxide and hydrogen over an iron type catalyst is fairly well known. In general, carbon monoxide and hydrogen in a molar ratio of about 1:2 are reacted in the presence of an iron catalyst. The synthesis reaction is advantageously carried out at a temperature within the range of about 500 to about 700° F. and at an elevated pressure, for example, at a pressure within the range of from 150 to about 550 pounds per square inch gauge. Under these conditions the synthesis product mixture may comprise about two liquid volumes of water and one volume of liquid organic compounds. The liquid organic compounds comprise hydrocarbons and oxygenated compounds. The oxygenated organic compounds may amount to from 5 to 20 volume per cent of the total normal liquid organic synthesis products.

Upon condensation of the synthesis reaction effluent, two liquid phases are obtained, one comprising water containing dissolved organic compounds, and the other comprising hydrocarbons and hydrocarbon soluble organic compounds. The hydrocarbon fraction obtained is made up of from about 5 to 10 weight per cent butanes and lighter, 70 to 80 weight per cent boiling within the range of from about 60 to about 400° F., and containing the motor fuel hydrocarbons, 10 to 20 weight per cent boiling within the range of from about 400 to 625° F., and suitable for production of Diesel fuel, and about 5 weight per cent waxy residue. The untreated hydrocarbon fraction as obtained upon condensation of the reaction effluent contains the hydrocarbon soluble alcohols, ketones, aldehydes and organic acids. In general, the higher molecular weight oxygenated compounds are hydrocarbon soluble while the lower molecular weight oxygenated compounds are water soluble.

The organic acids may be removed from the hydrocarbon fraction by washing with an aqueous solution of caustic, e. g., one volume of 15° Baumé sodium hydroxide to nine volumes of hydrocarbon treated. Alcohols, aldehydes, ketones, and any other oxygenated compounds may be effectively removed by extraction of the hydrocarbon

2 fraction with ethylene glycol. These methods of removing oxygenated compounds are effective but involve considerable expense, both initial investment cost and cost of the chemicals required for operation.

The present invention obviates the necessity of using chemical extraction in the treatment of the hydrocarbon fraction of the synthesis product. As disclosed in the copending application of Howard V. Hess et al., Serial Number 673,882, filed June 1, 1946, the acids and ethyl alcohol may be preferentially removed from the synthesis reaction effluent with the water by separation of the hydrocarbon and aqueous phases at elevated temperature and pressure. In accordance with the process of said application the reaction effluent is partly cooled to a temperature within the range of from about 200 to 300° F. without substantial reduction in pressure, so that two liquid phases form. One phase comprises a hydrocarbon-rich fraction containing substantially all of the aliphatic alcohols of more than two carbon atoms per molecule and a portion of the ethyl alcohol. The other liquid phase comprises a water-rich liquid mixture containing organic acids and the remainder of the ethyl alcohol. Small amounts of ketones and aldehydes may be present in both phases, while the bulk of the acids will be present in the water phase.

The effect of separation of the water phase and the hydrocarbon phase from the hydrocarbon synthesis effluent at an elevated temperature as opposed to conventional phase separation at approximately atmospheric temperature, is to change the distribution of oxygenated compounds in the two phases. At an elevated temperature within the range of from about 200° F. to about 300° F., the solubility of the oxygenated compounds other than acids in the hydrocarbon phase is increased while the major proportion of the acids is still retained in the aqueous phase. This shift in equilibrium between the hydrocarbon phase and the aqueous phase affords a means by which the oxygenated compounds may be conveniently separated in the reaction products. An economical separation is thereby made primarily between the acids and part of the ethyl alcohol on the one hand, and the non-acidic organic compounds on the other hand. The hydrocarbon phase, upon subsequent treatment, is converted into valuable motor fuel and Diesel fuels, while the aqueous phase may be treated for recovery of the organic acids and ethyl alcohol.

This high temperature phase separation results in practically all of the organic acids passing into the water phase. This is a rather unexpected result as is also the fact that under these conditions, substantially all of the alcohols of higher molecular weight than ethyl alcohol are passed into the hydrocarbon phase.

A gas phase comprising unreacted carbon monoxide and hydrogen, carbon dioxide, and low boiling organic compounds, such as methane and formaldehyde, may be separated from the synthesis mixture. Unreacted carbon monoxide and hydrogen as well as carbon dioxide may be removed from the gas phase and recycled to the synthesis reaction.

The water phase initially separated from the synthesis product is advantageously subjected to distillation to recover the ethyl alcohol and organic acids from the water. The ethyl alcohol is advantageously returned, at least in part, to the synthesis reactor to suppress the formation of alcohol therein; organic acids may be similarly recycled.

By effecting the initial separation of a water phase from the synthesis effluent at a temperature in the range 200 to 300° F., substantially all of the alcohols and particularly the $C_3$ and higher alcohols remain in the hydrocarbon phase and only a small amount, mainly ethyl alcohol, remains in the water phase. Thus, the water phase separated at a temperature of 200° F. contains on the order of 1 to 2 weight per cent oxygenated compounds, whereas one separated at 80° F. contains on the order of 6 to 8 per cent. Separation of the water phase from the hydrocarbon phase at temperatures above about 200° F. results in a water phase containing still less of the oxygenated compounds.

The pressure need be sufficient only to insure condensation of lower molecular weight organic compounds at the separation temperature. The pressure may range from about 150 pounds per square inch gauge to 550 pounds per square inch or higher. The higher pressures are somewhat advantageous in increasing the condensation of the low molecular weight compounds. Pressure, per se, has little, if any, effect on the distribution of the oxygenated compounds between the hydrocarbon phase and the water phase. Pressure has an indirect influence on the distribution in that it effects the composition of the condensate.

The separation is conveniently operated at the same pressure as the synthesis reactor, i. e., within the range of 150 to 550 pounds per square inch gauge. No unexpected advantage is obtained by increasing the separation pressure above the reactor pressure.

In accordance with my invention, a hydrocarbon fraction containing dissolved oxygenated compounds resulting from the phase separation at a temperature within the range of 200 to 300° F. and a pressure above about 150 pounds per square inch is subjected to catalytic treatment with an alumina catalyst. The catalytic treatment greatly improves the octane value of the motor fuel hydrocarbons and simultaneously converts the oxygenated compounds to olefins of a quality suitable for use in motor fuels. The catalytic treatment is effected by passing the hydrocarbon fraction into contact with a catalyst consisting essentially of alumina at a temperature within the range of from about 700 to about 900° F.

Suitable catalysts for the treatment of the hydrocarbon fraction are bauxite, synthetic alumina, fuller's earth, and other alumina-containing materials which have little catalytic activity for the cracking reaction. While silica may be present in the alumina catalyst, as in fuller's earth, the presence of silica tends to increase cracking. Silica in a form which is active as a catalyst for cracking hydrocarbons, e. g., silica gel, should be avoided. The treatment with the alumina catalyst effects mainly isomerization of olefinic constituents of the hydrocarbon mixture and simultaneously converts the oxygenated organic compounds contained therein to olefins. The olefins so produced are isomerized together with olefins contained in the original hydrocarbon synthesis product. Thus, the catalytic treatment effects conversion of alcohols and other oxygenated compounds to motor fuel hydrocarbons of high antiknock value.

The catalytic treatment results in a remarkable overall improvement in the octane value of the hydrocarbon fraction. The increase in octane value is dependent to some extent upon the fraction treated. A typical naphtha fraction having an initial boiling point of 115° F. (A. S. T. M. method) and an end point of 400° F. may be separated from the hydrocarbon rich phase obtained from the high temperature separation and separately catalytically treated, or a naphtha fraction may be separated following treatment of a fraction of wider boiling range. In either instance, an improvement in the octane value of the naphtha fraction on the order of from about 15 to 20 points, may be expected as the result of the catalytic treatment.

A fraction boiling within the range of from about 400 to about 625° F., suitable for preparation of Diesel fuel, may be separated from the raw or untreated hydrocarbon product. If a Diesel fuel is desired, the Diesel oil fraction is preferably separated from the hydrocarbon product prior to the catalytic treatment as the catalytic treatment results in a decrease in cetane number of the Diesel oil fraction by about 10 to 16 units. If the 400° F. and heavier fraction is to be subjected to cracking, the separation of this fraction from the naphtha fraction may be made either before or after the catalytic treatment.

The total liquid hydrocarbon fraction obtained on phase separation at elevated temperature and pressure may be subjected to the catalytic treatment. This results in conversion of the oxygenated compounds and improvement of octane value of the motor fuel hydrocarbons comparable to that obtained by separate treatment. The presence of the high boiling components, however, tends to decrease the capacity of the catalyst, or the permissible on-stream period prior to regeneration. Preferably, the waxy heavy residuum or the fraction boiling above about 625° F. is separated from the hydrocarbon product prior to the catalytic treatment.

By the catalytic treatment as practiced in the process of my invention, the typically high neutralization number of naphthas of the present class, as for example on the order of about 2.5, is reduced to a value of less than 0.1 while gum content and color stability are also considerably improved. The neutralization number is expressed in milligrams of potassium hydroxide per gram of hydrocarbon required for neutralization.

The present invention is not to be confused with catalytic cracking and reforming processes usually carried out on gas oils or gasoline under different conditions and with a material alteration in product distribution and yield. For example, thermally cracked naphthas have hitherto been contacted with clays under different conditions for reducing the sulfur content. Also, by the process known as isoforming, treatment at higher temperatures is employed to effect an improvement of octane rating in thermally cracked naphthas, whereas with identical treatment catalytically cracked naphthas show no material improvement. The catalytic treatment employed in the process of the present invention results in improvement in the anti-knock rating of the naphtha fraction of the hydrocarbon synthesis product which is superior to the aforementioned treatment of thermally cracked naphthas, with an accompanying elimination of objectionable oxygenated compounds, and high product yields.

The catalytic treatment effects simultaneous removal of oxygenated compounds and improvement in octane number. The oxygenated compounds present in the hydrocarbon fraction in relatively large amount are substantially completely converted to olefins. The unusually great improvement in octane value of the motor fuel fraction cannot be explained as resulting from removal of the oxygenated compounds as the removal of oxygenated compounds alone results in a slight decrease in the octane value of the raw naphtha fraction. The improvement obtained by treatment with the alumina catalyst indicates that the hydrocarbon structure is changed. It is believed that the primary reaction accompanying the deoxidation is meta-isomerism of the olefins or isomerization by shifting of the double bond towards the center position of the carbon chain. This is sharply in contrast to prior art processes of treating naphthas wherein the primary reaction is cracking. Cracking of the naphtha fraction during the catalytic treatment in the process of this invention is undesirable and is avoided as much as possible.

Fractions heavier than the naphtha fraction, for example, the hydrocarbon fraction boiling above 400° F., may be subjected to cracking if desired. Cracking of the hydrocarbons containing oxygenated compounds also effects simultaneous deoxygenation. Such treatment is preferably carried out by contacting the heavier hydrocarbons at an elevated temperature with a siliceous cracking catalyst. Under the more drastic conditions, e. g., the higher temperature levels and longer contact times, such silica-containing mixtures as fuller's earth accomplish some cracking. Fuller's earth is not comparable, however, to the active siliceous cracking catalysts, e. g., synthetic silica gel cracking catalysts. Such cracking is discussed herein primarily to distinguish the catalytic treatment used in the process disclosed from those processes for treatment of synthesis fractions boiling above about 350 to 400° F. wherein the primary reaction is cracking.

Water in the form of steam is preferably present in the hydrocarbon vapors passed into contact with the alumina catalyst. Suitably from about 5 to about 50 weight per cent of the charge to the catalyst and preferably about 20 weight per cent is steam. The hydrocarbon fraction obtained from the high temperature phase separation contains some dissolved water. When the total hydrocarbon fraction is subjected to catalytic treatment, it may not be necessary to add additional water or steam. The purpose of the water vapor in the feed to the catalyst is to prevent possible cracking of the hydrocarbons. Other diluents may be used for this purpose, but are in general less effective than steam.

The catalytic treatment results in the formation of some carbon which is deposited on the catalyst and some polymer tar which is in solution in the treated liquid hydrocarbons. The polymer tar amounts to from about 2 to about 8 weight per cent of the treated liquid hydrocarbon. This is readily removed from the treated hydrocarbon by distillation.

Some light gases are inevitably produced by the catalytic treatment. These are produced principally as a result of deoxygenating the oxygen-containing organic compounds. The removal of acids from the hydrocarbons in the phase separation step and the venting of carbon dioxide, together with other uncondensibles, results in a negligible carbon dioxide content in the light gases issuing from the catalytic treating reactor. Consequently, the light gases, comprising ethylene, may advantageously be recycled to the synthesis reactor for conversion into higher boiling hydrocarbons, thereby increasing the ultimate yield of motor fuel.

The treated hydrocarbon is preferably subjected to fractionation to effect removal of undesirable by-products higher and lower boiling than the desired hydrocarbon fraction. Obviously, the hydrocarbon fraction may be separated in any number of cuts as desired, suitably, a motor fuel fraction boiling within the range of from about 100 to about 400° F. and a gas oil cracking feed boiling above 400° F.

$C_3$ and $C_4$ olefins produced in the catalytic treating operation may be subjected to catalytic polymerization to produce polymer naphtha. The capacity of the catalyst for maximum improvement in octane value is limited. The effective on-stream time prior to renewal or regeneration of the catalyst is determined by the relationship of the volume of hydrocarbon treated to the volume of catalyst. Space velocities may vary between about 1 and about 10 liquid volumes of hydrocarbon per volume of catalyst per hour. Slightly greater improvement in octane values is obtained at the lower space velocities. In general, between about 10 and about 30 volumes of hydrocarbon may be treated for each volume of catalyst before regeneration of catalyst. The improvement in octane value of a typical hydrocarbon synthesis product decreases slowly above 10 v./v./cycle dropping to about half the initial value at about 100 v./v./cycle. The neutralization number of the treated hydrocarbon increases rather rapidly when the v./v./cycle is increased above about 30. There is little, if any, advantage in either octane value improvement or in conversion of oxygenated compounds (as indicated by low neutralization numbers) for operation at less than about 10 v./v./cycle. The volume of hydrocarbon treated is preferably between 10 and 20 v./v./cycle.

Pressures are advantageously near atmospheric, preferably within the range of from about atmospheric pressure to about 25 pounds per square inch gauge although the process is operable at higher pressures, e. g., 200 pounds per square inch or higher.

Catalyst sizes may be the typical sizes conventional in the case of vapor phase catalytic processes, with due regard to the avoidance of undesirable pressure drop in the catalyst zone. Suitable catalyst sizes are usually, for example, from 6 to 30 mesh and conventional pelleted catalysts may, of course, be employed.

The invention is in no way restricted to any specific method of contacting, being applicable to batch or fixed bed operation, or moving bed catalysts and to use with fresh or regenerated catalyst.

Usually it is advantageous to regenerate the catalyst after each on-stream or treating period and thereafter resubmit it to use in the treatment zone. Such a process obviously permits the use of any conventional type of apparatus whereby catalyst is permitted to reside in the reaction zone in contact with the hydrocarbon in vapor phase for the predetermined period of time, is then withdrawn, regenerated and returned. Such apparatus is exemplified by any of the conventional fluidized or moving bed systems operating under a controlled average catalyst residence time in the treatment and regeneration zones. Among these are the structures wherein the catalyst gravitates through the treatment chamber countercurrent to the incoming feed, and after a selected period of contact moves into a regenerating chamber. The process, however, does not require there refinements and is equally applicable to fixed bed operations where after a selected period on stream, the operation is terminated and the contents of the reactor subjected to regeneration.

Regeneration may be carried out in any conventional manner for catalysts of this class, for example, at temperatures of about 1050° F. and usually under pressure, as for example, 90 pounds per square inch gauge, with the continuous recirculation of an appropriate flue gas containing, for instance, about 5 per cent oxygen by volume until carbonaceous deposits are removed. It is to be understood however that the specific method of regeneration is immaterial to the present invention insofar as the catalyst is placed thereby in fully regenerated condition. In short, the temperatures and pressures are not critical and may be varied widely, and the regenerating gas may comprise steam or any other conventional medium; any suitable diluent may be used to control the rate of regeneration.

It is to be understood that this invention is generally applicable to the synthesis of hydrocarbons by the catalytic reduction of carbon monoxide with hydrogen in the presence of typical catalysts for this purpose. Such catalysts are those of the iron group, e. g., cobalt, iron, nickel, at the well established operating temperatures and pressures which characterize the respective catalysts. As is also known, the optimum conditions vary for equivalent catalysts, being in somewhat lower ranges of temperature and pressure for cobalt catalysts, typically 400° F. and substantially atmospheric pressure. Obviously too, the synthesis catalyst may include conventional activators and promoters, for example, alkali or alkaline earth metal oxides, alumina, titania, etc.

Obviously, many modifications and variations of the invention, as hereinbefore set forth, may be made without departing from the spirit and scope thereof and, therefore, only such limitations should be imposed as are indicated in the appended claims.

I claim:

1. A process for the manufacture of motor fuel hydrocarbons which comprises reacting carbon monoxide with hydrogen in the presence of an iron catalyst at a temperature within the range of from about 500 to about 700° F. and a pressure within the range of from about 150 to about 550 pounds per square inch gauge, subjecting the resulting reaction products to a temperature within the range of from 200 to 300° F. and a pressure within the range of 150 to 550 pounds per square inch gauge whereby condensate is formed comprising a hydrocarbon-rich phase and a water-rich phase, withdrawing the hydrocarbon-rich phase and subjecting same to fractionation to separate therefrom a fraction boiling within the range of 100 to 625° F., passing said fraction in vapor phase at a temperature within the range of 700 to 900° F. into contact with a catalyst comprising essentially alumina at a space velocity within the range of 1 to 10 liquid volumes of hydrocarbon per volume of catalyst per hour, and recovering the resulting treated hydrocarbon fraction of improved octane value.

2. A process as defined in claim 1 wherein the catalyst is bauxite.

3. A process as defined in claim 1 wherein the catalyst is fuller's earth.

4. A process as defined in claim 1 wherein the catalytic treatment is carried out in the presence of steam amounting to 5 to 50 weight per cent of the feed to the catalyst.

5. In a process for the synthesis of motor fuel hydrocarbons by the interaction of carbon monoxide and hydrogen in the presence of a catalyst of the iron group, the improvement comprising subjecting the products of the synthesis reaction to a temperature within the range of 200 to 300° F. and a pressure within the range of 150 to 550 pounds per square inch whereby immiscible condensate phases are formed comprising a hydrocarbon-rich fraction and a water-rich fraction, withdrawing the hydrocarbon-rich fraction and passing said fraction in vapor phase at a temperature within the range of 700 to 900° F. into contact with a catalyst comprising essentially alumina, and recovering the resulting treated hydrocarbon fraction of improved octane value.

6. A process for the manufacture of motor fuel hydrocarbons which comprises reacting carbon monoxide with hydrogen in the presence of an iron catalyst at a temperature within the range of from about 500 to about 700° F. and a pressure within the range of from about 150 to about 550 pounds per square inch gauge, subjecting the resulting reaction products to a temperature within the range of from 200 to 300° F. and a pressure within the range of 150 to 550 pounds per square inch gauge, whereby condensate is formed comprising a hydrocarbon-rich phase and a water-rich phase, withdrawing the hydrocarbon rich phase and subjecting same to fractionation to separate therefrom a fraction boiling within the range of 100 to 400° F., passing said fraction in vapor phase admixed with 5 to 50 weight per cent steam based on the composite mixture into contact with bauxite at a pressure within the range of from about atmospheric to about 25 pounds per square inch gauge and at a temperature within the range of 200 to 900° F. and a space velocity within the range of 1 to 10 liquid volumes of hydrocarbon per volume of catalyst per hour, recovering the resulting treated hydrocarbon fraction of improved octane value, and subjecting the resulting treated hydrocarbon fraction to further fractionation to effect removal of materials higher boiling than the untreated hydrocarbon feed to the catalyst.

7. In a process for the synthesis of motor fuel hydrocarbons by the interaction of carbon monoxide and hydrogen in the presence of a catalyst of the iron group, the improvement comprising subjecting the products of the synthesis reaction to a temperature within the range of 200 to 300° F. and a pressure within the range of 150 to 550 pounds per square inch whereby immiscible condensate phases are formed comprising a hydrocarbon-rich phase and a water-rich phase, separating a hydrocarbon-rich fraction from said hydrocarbon-rich phase and passing said fraction in vapor phase at a temperature within the range of 700 to 900° F. and under substantially non-cracking conditions into contact with a catalyst containing alumina in an amount sufficient to effect isomerization of unsaturated hydrocarbons by shifting of the double bond.

JAMES H. GRAHAME.

No references cited.